(12) United States Patent
Rutz et al.

(10) Patent No.: US 11,726,055 B2
(45) Date of Patent: Aug. 15, 2023

(54) MEASUREMENT UNIT FOR AN ION-SENSITIVE SOLID-STATE ELECTRODE AND ION-SENSITIVE ELECTRODE

(71) Applicant: Mettler-Toledo GmbH, Greifensee (CH)

(72) Inventors: Andreas Rutz, Zürich (CH); Philippe Ehrismann, Uster (CH); Juan Limon Petersen, Bonstetten (CH); Corrado Barcella, Endingen (CH)

(73) Assignee: METTLER-TOLEDO GMBH, Greifensee (CH)

( * ) Notice: Subject to any disclaimer, the term of this patent is extended or adjusted under 35 U.S.C. 154(b) by 145 days.

(21) Appl. No.: 16/942,281

(22) Filed: Jul. 29, 2020

(65) Prior Publication Data

US 2020/0355641 A1   Nov. 12, 2020

Related U.S. Application Data

(63) Continuation of application No. PCT/EP2019/052148, filed on Jan. 29, 2019.

(30) Foreign Application Priority Data

Jan. 30, 2018 (EP) .................................... 18154259

(51) Int. Cl.
G01N 27/36 (2006.01)
G01N 27/30 (2006.01)

(52) U.S. Cl.
CPC ........... *G01N 27/36* (2013.01); *G01N 27/302* (2013.01)

(58) Field of Classification Search
CPC .............................. G01N 27/36; G01N 27/302
See application file for complete search history.

(56) References Cited

U.S. PATENT DOCUMENTS 3,700,577 A   10/1972 Grauer
3,923,625 A   12/1975 Fischer et al.
(Continued)

FOREIGN PATENT DOCUMENTS

DE   2220841 A1   11/1972
DE   3727485 A1   3/1988
(Continued)

OTHER PUBLICATIONS

Hiroshi et al. (JPS5244692A, machine translation) (Year: 1977).*
(Continued)

*Primary Examiner* — Joshua L Allen
(74) *Attorney, Agent, or Firm* — Buchanan Ingersoll & Rooney PC

(57) ABSTRACT

Measurement unit for an ion-sensitive solid-state electrode, that serves to measure pH in a measurement solution, with a layered structure including an ion-sensitive glass layer with a first ring-shaped contact surface, an electrically conducting layer that directly or via at least one intermediate layer adheres to the ion-sensitive glass layer, and a substrate that adheres to the electrically conducting layer and is provided with a second ring-shaped contact surface; and with a holding member that is provided with a first ring-shaped sealing surface, a second ring-shaped sealing surface, and an annular section; wherein the first ring-shaped sealing surface is sealingly connected to the first ring-shaped contact surface, wherein the second ring-shaped sealing surface is connected to the second ring-shaped contact surface of the substrate, and wherein the first and second ring-shaped sealing surfaces of the holding member are sealingly connected by the annular section.

19 Claims, 6 Drawing Sheets

(56) References Cited

U.S. PATENT DOCUMENTS

| | | | | |
|---|---|---|---|---|
| 4,031,606 | A | * | 6/1977 | Szonntagh ............ G01N 27/36 427/80 |
| 4,073,052 | A | * | 2/1978 | Szonntagh ............ G01N 27/36 29/25.03 |
| 4,073,053 | A | * | 2/1978 | Szonntagh ............ G01N 27/36 427/80 |
| 4,133,735 | A | | 1/1979 | Afromowitz et al. |
| 4,182,667 | A | | 1/1980 | Dickinson et al. |
| 4,280,889 | A | * | 7/1981 | Szonntagh ........... G01N 27/333 204/420 |
| 4,440,620 | A | * | 4/1984 | Ono ..................... G01N 27/333 324/438 |
| 4,632,732 | A | * | 12/1986 | Fog ....................... G01N 27/36 205/787.5 |
| 2009/0236224 | A1 | | 9/2009 | Yamasato et al. |
| 2014/0360245 | A1 | | 12/2014 | Oberlin et al. |
| 2017/0057859 | A1 | * | 3/2017 | Voigtländer ............ C03C 8/24 |
| 2017/0160228 | A1 | | 6/2017 | Pechstein et al. |

FOREIGN PATENT DOCUMENTS

| | | |
|---|---|---|
| DE | 19620568 A1 | 11/1997 |
| DE | 19714474 A1 | 10/1998 |
| DE | 10018750 C2 | 3/2003 |
| EP | 0420983 A1 | 4/1991 |
| EP | 3309541 A1 | 4/2018 |
| JP | S5244692 A * | 4/1977 |
| JP | S58053746 B2 | 12/1983 |
| JP | S58191558 U | 12/1983 |
| JP | H08119684 A | 5/1996 |
| WO | 0104615 A1 | 1/2001 |

OTHER PUBLICATIONS

International Preliminary Report on Patentability and Written Opinion of the International Searching Authority (Forms PCT/IB/373 and PCT/ISA/237) dated Aug. 4, 2020, by the International Bureau of WIPO, in corresponding International Application No. PCT/EP2019/052148. (12 pages).

International Search Report (PCT/ISA/210) dated Mar. 1, 2019, by the European Patent Office as the International Searching Authority for International Application No. PCT/EP2019/052148.

Written Opinion (PCT/ISA/237) dated Mar. 1, 2019, by the European Patent Office as the International Searching Authority for International Application No. PCT/EP2019/052148.

* cited by examiner

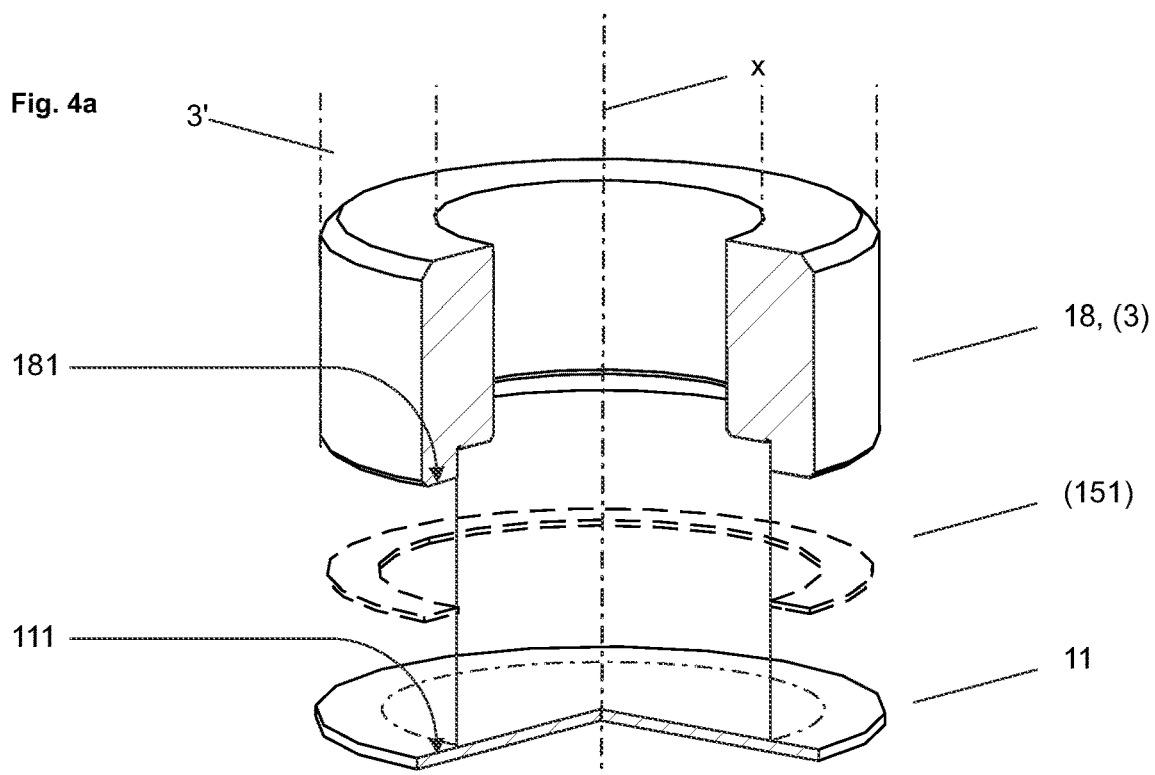
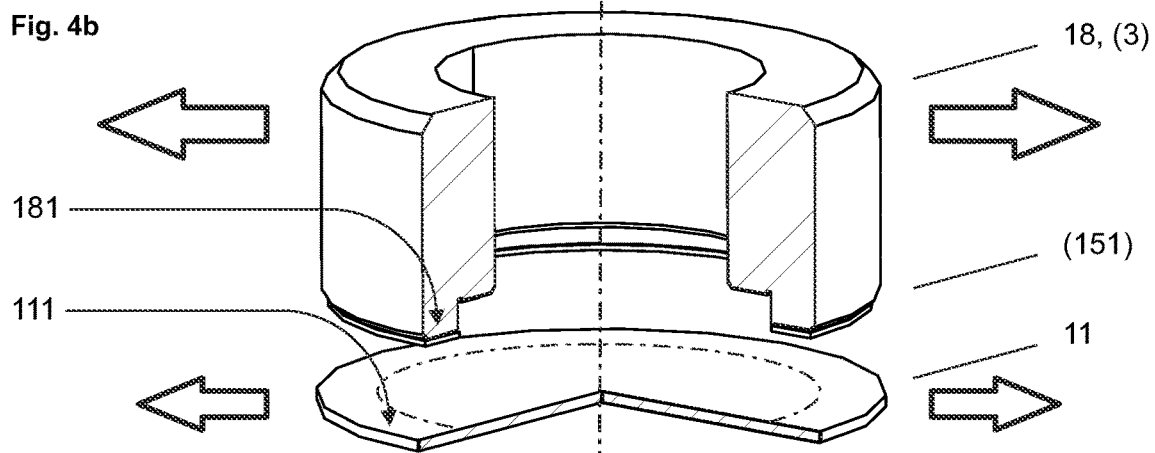
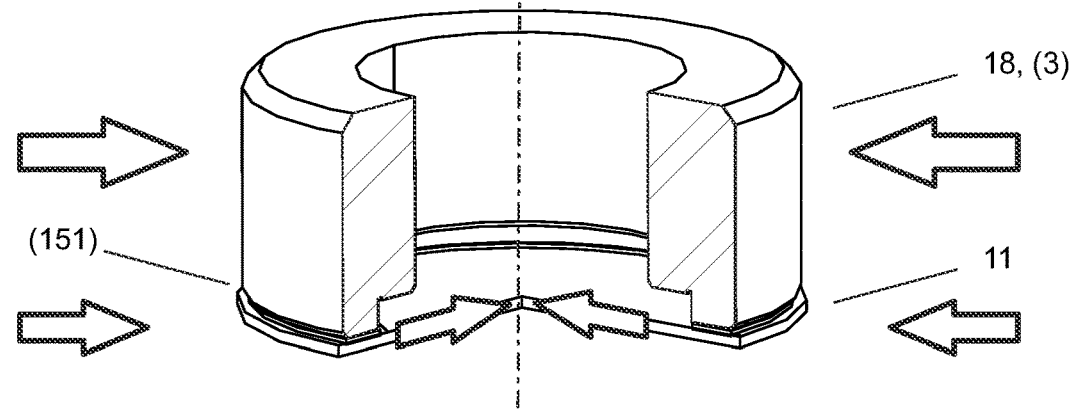

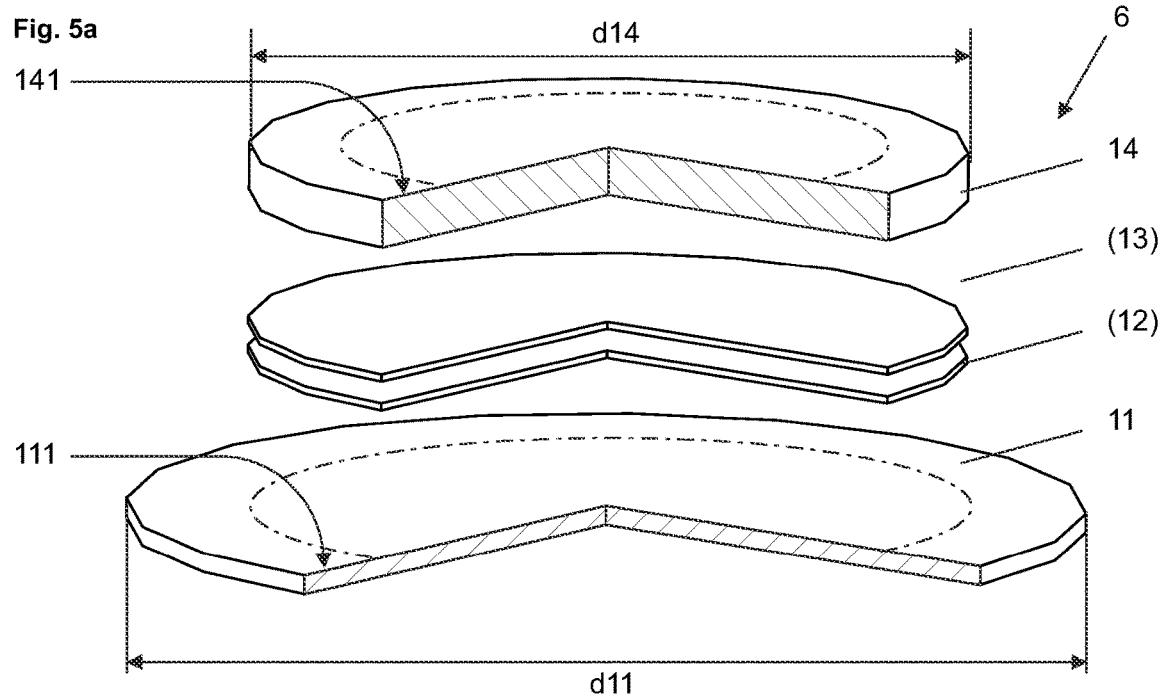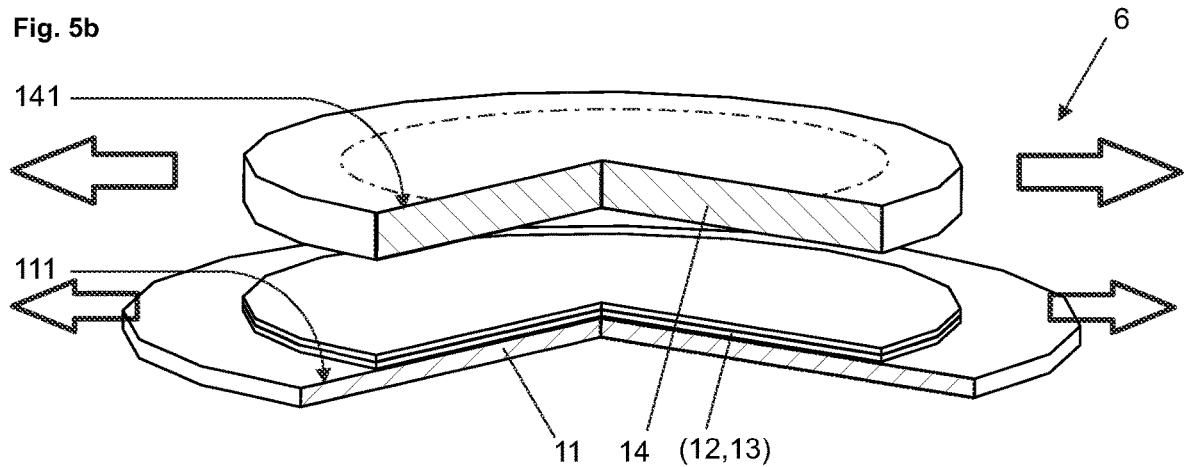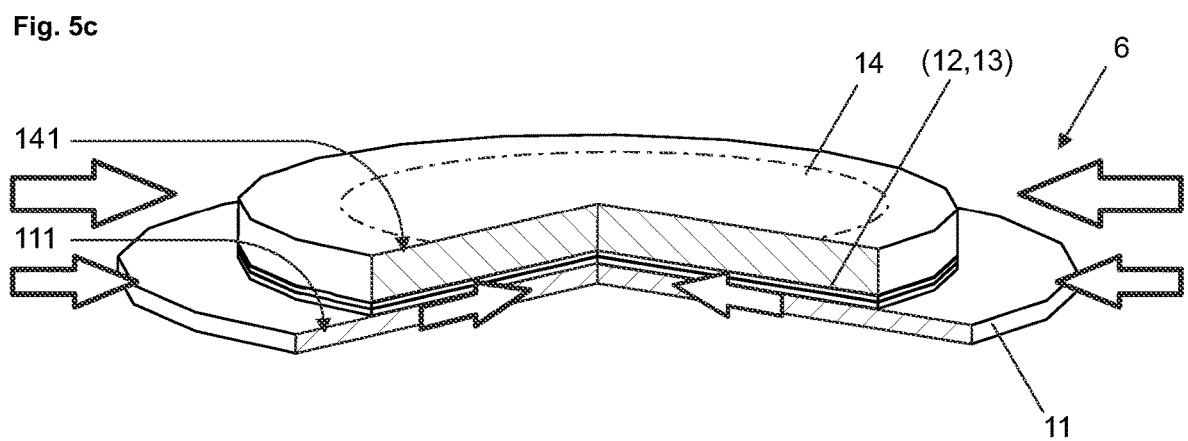

MEASUREMENT UNIT FOR AN ION-SENSITIVE SOLID-STATE ELECTRODE AND ION-SENSITIVE ELECTRODE

RELATED APPLICATION

This application claims priority as a continuation application under 35 U.S.C. § 120 to PCT/EP2019/052148, which was filed as an International Application on Jan. 29, 2019 designating the U.S., and which claims priority to European Application 18154259.8 filed in Europe on Jan. 30, 2018. The entire contents of these applications are hereby incorporated by reference in their entireties.

FIELD

The present disclosure relates to a solid-state measurement unit for a solid-state ion-sensitive electrode and to an ion-sensitive electrode provided with the solid-state measurement unit.

BACKGROUND INFORMATION

In laboratories and industrial processes, glass electrodes are often used for measuring ion activities, in particular pH-values. These glass electrodes can include a thin ion-sensitive glass membrane, which is attached or melted to the end piece of a glass shaft of the glass electrode.

Principles of pH-measurement and related pH-electrodes are described in "A guide to pH-measurement", March 2016, Mettler-Toledo GmbH. The pH-electrode can include (e.g., consists of) a glass shaft having a thin glass membrane at one end, which is sensitive to $H^+$-ions. An outer gel layer forms on the outside of this membrane glass, when the membrane is exposed to a measurement solution. In addition, an inner gel layer forms on the inside of the glass membrane, as the electrode is filled with an internal buffer. The $H^+$-ions either diffuse into or diffuse out of the outer gel layer, depending on the $H^+$-ion concentration or the pH-value of the measurement solution. If the solution is alkaline the $H^+$-ions diffuse out of the layer and a negative charge is established on the outer side of the membrane. As the internal buffer has a constant pH-value, the potential on the inner surface of the membrane remains constant during the measurement. Therefore, the potential measured by the pH-electrode is the difference between the constant inner and the variable outer charge of the ion-sensitive glass membrane. Additionally, the inner buffer contains a constant concentration of chloride that produces a constant potential to the silver/silver chloride Ag/AgCl electrode immersed in the same inner buffer. This electrochemical chain connects the potential of the glass membrane to the potential of the electrical wire leading out of the electrode.

The potential measured by the pH-electrode is compared to a reference potential provided by a reference electrode, such as an Ag/AgCl-electrode immersed in a reference solution, which is indirectly in contact with the measurement solution via a junction. This known reference electrode will therefore always produce the same, constant potential, irrespective of the solution to be measured.

Ion sensitive electrodes with a glass membrane exhibit excellent measurement properties. pH-electrodes for example show favourable properties in terms of slope, long-term stability, selectivity and detection limit, but also have disadvantages. Classic glass electrodes can only be used in a given orientation. In addition, glass electrodes show mechanical weaknesses, as they can break easily with the result that bits of broken glass get into the measurement solution, which must strictly be avoided, particularly in processes of the food industry.

DE2220841A1 discloses an ion-sensitive electrode, in which an inner buffer solution creating a constant potential is replaced by metal deposited on an ion-sensitive glass membrane. An ion-sensitive electrode is referred to as solid-state ion-sensitive electrode, when its internal buffer is replaced by solid material. Such measures allow electrodes to be manufactured with significantly reduced dimensions, but known ion-sensitive electrodes with a solid internal buffer also show considerable drawbacks.

Due to the high impedance of ion-sensitive glass membranes, the electrical isolation of metal elements is often critical. Further, due to the exposure to ambient chemical reactants such as oxygen ($O_2$), water ($H_2O$), nitrogen ($N_2$), carbon dioxide ($CO_2$), etc., specific metal electrodes may be damaged or destroyed. Furthermore, chemical interactions between specific electrically conducting layers and the glass layer may occur, which may lead to damage or destruction of the glass layer. Still further, performance and properties of ion-selective solid-state electrodes compared to known ion-sensitive electrodes are still not as desired. Furthermore, limitations of the measurement an exemplary range and insufficient stability with regard to pressure and temperature were experienced. Below, technical solutions and a plurality of related problems are discussed in the detail.

U.S. Pat. No. 4,632,732A discloses a solid-state electrode with an ion-sensitive glass membrane connected to a glass tube and a solid contact material including (e.g., consisting of) lithium-vanadium-oxide ($Li_xV_2O_5$), which forms an intercalation electrode. The solid contact material is sintered to the inner side of the glass membrane and electrically connected to a shielded electrode cable.

DE3727485A1 discloses another solid-state electrode with an ion-sensitive glass membrane connected to a glass tube and an intercalation electrode including (e.g., consisting of) material also used for lithium batteries. Such intercalation electrodes may exhibit intrinsic electrochemical hysteresis, which may impair the performance of the ion-sensitive electrode. Furthermore, exposure of the electrode materials to ambient chemical reactants (such as $O_2$, $H_2O$, $N_2$, $CO_2$, etc.) may further degrade performance.

Further, with regard to using a single phase or multiphase lithium layer adjoining a thin-walled ion-sensitive glass membrane, it is important to note that studies of lithium/silicon-dioxide ($Li/SiO_2$) systems have shown that in these systems a substantial reduction of the glass matrix can occur, which significantly degrades the performance of the ion-selective electrode and drastically limits its lifespan.

DE19714474A1 discloses an electro-chemical sensor with an ion-sensitive glass membrane, which is in direct contact with a steel-ceramic substrate. All layers are produced by thick film technology. It is stated that in layered structures with a metal layer and a glass layer having different thermal expansion coefficients the glass layer may be damaged or even destroyed when exposed to temperature changes, which cause cracks or fissures. In order to avoid this problem, DE3727485A1 discloses the use of layers that exhibit thermal expansion coefficients α, which are identical or differ at most by a value $\Delta\alpha < 6 \cdot 10^{-7}/K$.

DE19714474A1 further discloses, that the problem of glass breaking occurs not only with solid-state electrodes but also with known glass electrodes that include a thin glass membrane melted to a glass shaft as described in "A guide to pH-measurement", March 2016, Mettler-Toledo GmbH. In order to avoid glass breakage with this type of electrodes it is recommended in DE19714474A1 that the adjoining materials exhibit thermal expansion coefficients α, which are identical or differ at most by a value $\Delta\alpha < 7 \cdot 10^{-7}/K$. Hence, the problem of glass breakage occurs in various exemplary embodiments of known electrodes including a thin-walled ion-sensitive glass membrane.

DE19620568A1 discloses an ion-sensitive glass electrode including a double layer glass membrane with an inner glass layer with electronic and ionic conductivity and an ion-sensitive glass layer facing the measurement solution. The glass layers are melted together and form a thin walled spherical or cylindrical membrane, which is attached or melted to one end of a glass electrode shaft having a linear thermal expansion coefficient matching those of the glass layers, see DE2220841A1. The inner surface of the electrode body, formed by the membrane and the electrode shaft, is completely covered with a solid adherent silver layer connected to a contact wire. Inside the electrode body an elastic support body is provided that for example, is made of silicone rubber. The elastic support body has a sealing function, which is sufficient for the materials used, but would scarcely fulfil the sealing requirements of materials that are easily reacting with ambient chemical reactants.

DE10018750C2 discloses another ion-sensitive glass electrode including a glass membrane with an outer side in contact with a measurement solution and with an inner side in firm contact with a metal contact layer, which is connected to an internal conductor.

U.S. Pat. No. 4,133,735A discloses an ion-sensitive electrode with a substrate having a planar wafer surface, on which a continuous conducting layer is formed by either thin-film vapour deposition or thick-film screening processes. A first region of the continuous conducting layer and related portions of the wafer surface are covered by a continuous membrane layer of a pH-sensitive glass. An insulated connecting lead is connected directly to a second region of the conducting layer. Alternatively, an electronic device chip with output leads is bonded to the wafer and connected with its input via the connecting lead to the second region of the conducting layer. The exposed conducting elements of the electrode, including the second region of the conducting layer, the active device chip, and all exposed portions of the leads, are covered by a protective fluid-tight seal. The seal may be formed from a flattened, non-pH-sensitive glass tube, which is filled with a cured epoxy resin. Alternatively, the seal may be formed from heat-shrinkable tubing, e.g. composed of polyvinyl chloride, filled with an appropriate hydrophobic potting material such as beeswax. A sealing of this type, which is for exampleused in the art, does not satisfy the demands of electrode materials that are more sensitive to the exposure of ambient chemical reactants (such as $O_2$, $H_2O$, $N_2$, $CO_2$, etc.).

U.S. Pat. No. 4,280,889A discloses a solid-state ion-sensitive electrode using silver/silver chloride (Ag/AgCl) electrodes as reference electrode and as pH measuring electrode, which can be provided as separate units or combined in a common encapsulation. For both electrodes, a layered structure with an insulating substrate is provided, on which a first layer of chromium followed by a second layer of silver, a third layer of silver chloride and a final ion sensitive glass layer are deposited. For the pH measuring electrode, the thermal expansion coefficients of the glass layer and the adjoining layer of silver chloride are matched, so that cracks in the glass layer are avoided. For the reference electrode, the thermal expansion coefficients of the glass layer and the adjoining layer of silver chloride are not matched, so that cracks in the glass layer are randomly caused during temperature cycling of the reference electrode. These cracks provide ion conduction paths to the silver chloride layer from an aqueous solution in which the reference electrode is immersed during ion concentration measurements. U.S. Pat. No. 4,280,889A therefore teaches matching thermal expansion coefficients of adjoining layers of a layered structure in order to avoid cracks in the glass layer and not matching adjoining layers of a layered structure to create cracks fulfilling a specific function.

EP0420983A1 discloses a solid phase electrode with an ion-sensitive membrane connected to a glass tube and that is provided with a solid phase contact made of an oxide compound on the side facing the glass tube.

WO/0104615A1 discloses a solid-state electrode including a metal core of a lithium alloy, which adheres firmly to the inner face of an ion-sensitive glass membrane that is containing lithium, and which is melted to a lower end of a glass tube made of known glass. The metal core is protected from ambient influences by means of a metal sealing plug inserted into the glass tube. However, it appears that this kind of sealing is not optimal, as ambient chemical reactants (such as $O_2$, $H_2O$, $N_2$, $CO_2$, etc.) may intrude through capillaries remaining between the inside of the glass tube and the outside of the metal core. Such capillaries may result through changes of the ambient temperature e.g. during measurement processes.

Hence, known solid-state ion-sensitive electrodes have several drawbacks. Drawbacks relate to the destruction of the materials used or layers when exposed to ambient chemical reactants, and the destruction of the ion-sensitive glass membrane when exposed to the adjoining metal layers or the destruction of metal layers when exposed to ambient chemical reactants. The impact of mechanical forces and tensions during handling and operation of the ion-sensitive electrode may lead to damages of the glass membrane, such as cracks and fissures.

SUMMARY

A measurement unit is disclosed for an ion-sensitive solid-state electrode for measuring pH in a measurement solution, with a layered structure, the measurement unit comprising: an ion-sensitive glass layer with a first ring-shaped contact surface; an electrically conducting layer that directly or via at least one intermediate layer adheres to the ion-sensitive glass layer, and a substrate that adheres to the electrically conducting layer and is provided with a second ring-shaped contact surface, and with a holding member that is provided with a first ring-shaped sealing surface, a second ring-shaped sealing surface, and an annular section; wherein the first ring-shaped sealing surface is sealingly connected to the first ring-shaped contact surface, wherein the second ring-shaped sealing surface is connected to the second ring-shaped contact surface of the substrate, and wherein the first and second ring-shaped sealing surfaces of the holding member are sealingly connected by the annular section.

BRIEF DESCRIPTION OF THE DRAWINGS

In the following description, additional features and advantages will be apparent to those skilled in the art from reading a detailed description of exemplary embodiments, as described with respect to the accompanying drawings, wherein:

FIG. 4a shows the exemplary ion-sensitive glass layer 11 and the holding member 18 of the measurement unit 1 of FIG. 2 before connecting to one another optionally by means of an annular preform 151;

FIG. 4b shows the exemplary expanded ion-sensitive glass layer 11 and the expanded holding member 18 of FIG. 4a while being connected to one another at a process temperature well above a maximum operating temperature of the measurement unit 1;

FIG. 4c shows the exemplary contracted ion-sensitive glass layer 11 and the contracted holding member 18 of FIG. 4b connected to one another, e.g. by means of an annular preform 151, at room temperature with a pressure with radially acting forces applied by the holding member 18 onto the ion-sensitive glass layer 11;

FIG. 5a shows the exemplary ion-sensitive glass layer 11 and the substrate 14 of the measurement unit 1 of FIG. 2 with an optionally separated electrically conducting layer 13 and at least one optional intermediate layer 12 before being connected to one another;

FIG. 5b shows the exemplary expanded ion-sensitive glass layer 11 and the expanded substrate 14 of FIG. 5a with the electrically conducting layer 13 and the at least one optional intermediate layer 12 attached to the ion-sensitive glass layer 11, while being connected to one another at a process temperature well above the maximum operating temperature of the measurement unit 1;

FIG. 5c shows the exemplary contracted ion-sensitive glass layer 11 and the contracted substrate 14 with the electrically conducting layer 13 and the at least one optional intermediate layer 12 of FIG. 5b connected to one another at room temperature with a pressure with radially acting forces applied by the substrate 14 onto the ion-sensitive glass layer 11.

DETAILED DESCRIPTION

Figure 1:
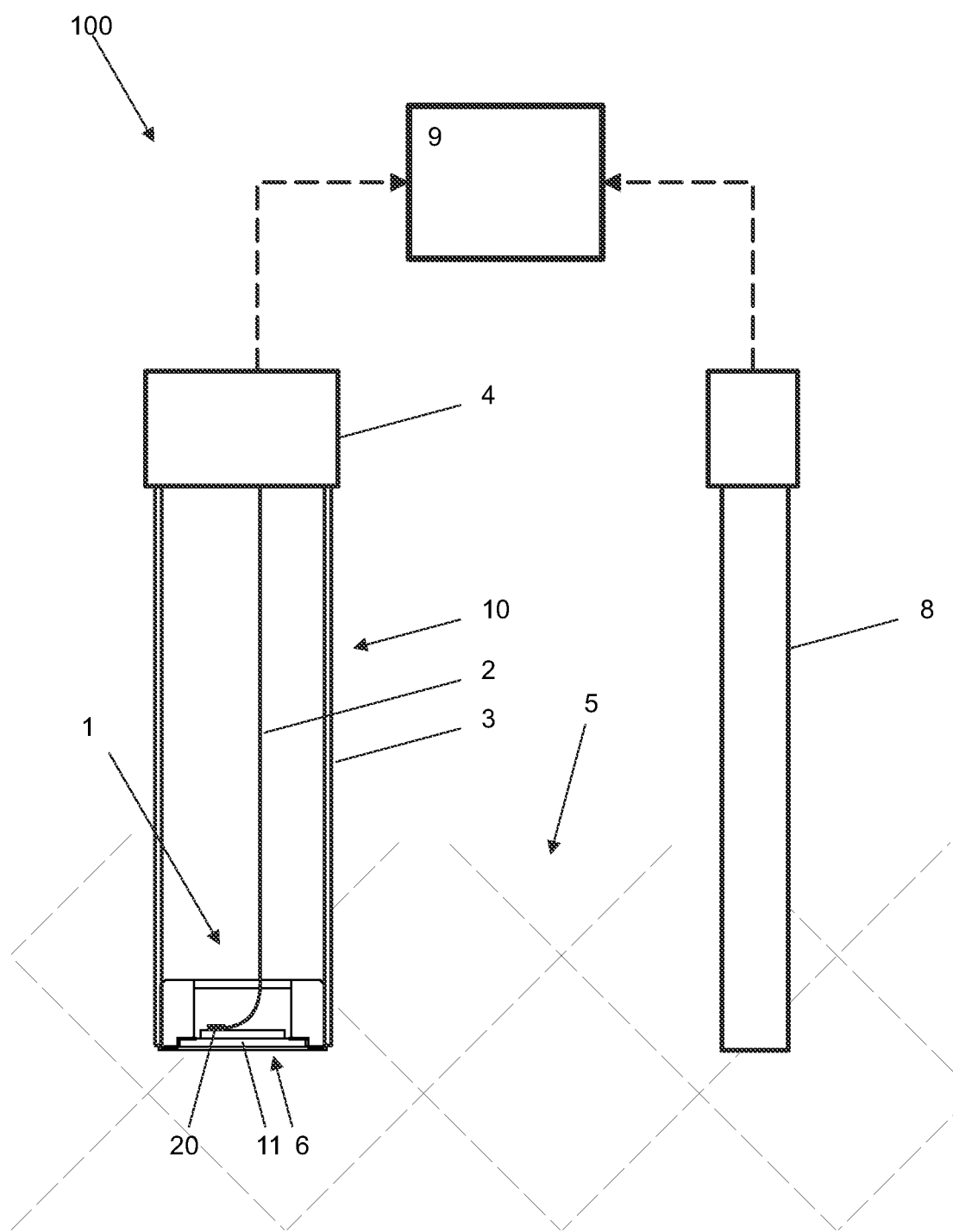
FIG. 1 shows an exemplary measurement system 100 with an exemplary ion-sensitive electrode 10 equipped with an exemplary solid-state measurement unit 1 and a reference electrode 8 immersed in a measurement solution 5.

An improved solid-state measurement unit is disclosed for an improved ion-sensitive solid-state electrode, for example an improved solid-state pH-electrode, and an improved ion-sensitive solid-state electrode that is equipped with this solid-state measurement unit.

An exemplary solid-state ion-sensitive electrode equipped with the solid-state measurement unit can have an improved performance, robustness and durability. The elements of the ion-sensitive electrode can be well protected against ambient chemical and physical influences, when being stored, handled or used for measurement purposes.

An exemplary measurement unit, which is intended for an ion-sensitive solid-state electrode, such as a pH-electrode, and which serves to measure an ion activity in a measuring solution, includes a layered solid-state structure with an ion-sensitive glass layer provided with a first ring-shaped contact surface, with an electrically conducting layer that directly or via at least one intermediate layer adheres to the ion-sensitive glass layer, and with a substrate that adheres to the electrically conducting layer and is provided with a second ring-shaped contact surface. The exemplary measurement unit includes a holding member that is provided with a first ring-shaped sealing surface, a second ring-shaped sealing surface and an annular section, wherein the first ring-shaped sealing surface is sealingly connected to the first ring-shaped contact surface and wherein the second ring-shaped sealing surface is connected to the second ring-shaped contact surface, and wherein the first and second ring-shaped sealing surfaces are sealingly connected by the annular section of the holding member. The first and second contact surfaces and the first and second sealing surfaces are ring-shaped or loop-shaped and form closed loops with any suitable form, for example, a circular, rectangular, oval or any other curved form.

Two separate contact regions of the holding member can be sealingly connected to the substrate, a first region to the ion-sensitive glass layer and a second region to the substrate. The exemplary layers of the layered structure are therefore hermetically sealed from the outer environment, thus inhibiting access of ambient chemical reactants such as $O_2$, $H_2O$, $N_2$, $CO_2$, etc. to the contact regions of the layers of the layered structure, particularly to the sensitive electrically conducting layer and any intermediate layer.

Hence, hermetically sealing the layered structure allows the use of materials that otherwise may easily be destroyed by exposure to ambient chemical reactants. Furthermore, as the electrically conducting layer and, if present, the at least one intermediate layer are perfectly protected, these layers can be applied with a minimum thickness, for example, in the exemplary range from 10 nm to 10 µm (e.g., plus or minus 10%), using any deposition process, such as PVD and/or electroplating, on the substrate or the glass layer, which serve as a carrier for the deposited material.

In an exemplary embodiment, the holding member includes ceramic or glass. The solid-state measurement unit can therefore be integrated into any structure of any ion-sensitive electrode. Furthermore, the applied technology allows the solid-state measurement unit to be designed and configured practically with any desired dimensions. Due to the rigidity and improved encapsulation, the solid-state measurement unit can be applied in any processes, such as industrial processes with high demand.

The substrate includes at least one or more of the following materials: metal, steel, ceramic, glass, glass ceramic, polymer compound, fibre composite material. The substrate is for example, disk shaped. Further, the substrate has a thickness for example, in the exemplary range of 0.2 mm-1.5 mm (e.g., plus or minus 10%), selected according to the mechanical stability required.

The exemplary electrically conducting layer includes a metal or metal alloy, for example, an alkali metal or alkali metal alloy, such as lithium or a lithium alloy, with an exemplary reduction potential of at least about 1.0 V. The substrate and the electrically conducting layer may be a unitary part with homogeneous material over the whole cross-section. The electrically conducting layer may also be an integral part of the substrate, wherein one side exhibits specific metallic properties and may be coated for example by a film of metal, for example, alkali metal or an alloy including alkali metal.

An exemplary intermediate layer, if present, is for example, made of a solid-state electrolyte that conducts ions released from the electrically conducting layer. In an exemplary embodiment, the electrically conducting layer includes or includes (e.g., consists of) lithium or a lithium alloy, so that the intermediate layer would transfer lithium ions. An intermediate layer, including a solid-state electrolyte, separates the electrically conducting layer, including lithium or a lithium alloy, from the ion-sensitive glass layer or glass membrane, so that a reduction of the glass matrix by the material of the electrically conducting layer is avoided.

The ion-sensitive glass layer is made of a glass that for example, conducts ions of the electrically conducting layer. If the electrically conducting layer includes or includes (e.g., consists of) lithium or a lithium alloy then the ion-sensitive glass layer would transfer lithium ions.

In an exemplary embodiment, the first and second ring-shaped sealing surfaces and/or the first and second ring-shaped contact surfaces form circular closed loops and/or are arranged concentrically or offset from one another. Arranging the ring-shaped sealing surfaces and the ring-shaped contact surfaces in closed loops ensures perfect sealing.

In another exemplary embodiment, the for example, disc shaped substrate has an upper side facing a lower side of the holding member. With its lower side the substrate faces the electrically conducting layer, if present the intermediate layer, and the upper side of the ion-sensitive glass layer. The ion-sensitive glass layer faces with its lower side the measurement solution.

The layered structure is for example, provided with a first stepped profile with the ion-sensitive glass layer having a diameter that is larger than the diameter of the substrate, for example, that of the adjoining electrically conducting layer, and if present that of the at least one intermediate layer. The first stepped profile of the layered structure complements a second stepped profile provided at the lower side of the holding member. Using first and second stepped profiles that are complementing one another has multiple advantages. Arranging the connections between the holding member and the ion-sensitive glass layer and the holding member and the substrate on different levels ensures good separation between these connections. Further, mechanical engagement between the stepped profiles increases mechanical stability. Still further, the use of stepped profiles avoids the requirement of a larger displacement of the connecting zones relative to the central axis of the measurement unit, which therefore can be manufactured with smaller dimensions.

Further, particularly with the stepped profiles, the first ring-shaped contact surface can be located on the upper side of the ion-sensitive glass layer and the second ring-shaped contact surface can be located on the upper side of the substrate. This exemplary arrangement facilitates assembly and manufacturing processes, in particular the position processes, mounting processes as well as fusing or melting processes.

The first ring-shaped sealing surface of the holding member is for example, arranged in a first plane and the second ring-shaped sealing surface of the holding member is arranged in a second plane, which first and second planes are aligned in parallel to the substrate for example, with a distance between one another that corresponds at least approximately to the thickness of the substrate plus the thickness of the electrical conducting layer and, if present, the at least one intermediate layer. The planar arrangement of the layers and sealing and contact surfaces further facilitates manufacturing processes.

Various processes and materials can be used for bonding the first ring-shaped sealing surface and the first ring-shaped contact surface of the ion-sensitive glass layer as well as the second ring-shaped sealing surface and the second ring-shaped contact surface of the substrate with one another.

Bonding may be accomplished by for example diffusion of the adjoining ring-shaped sealing and contact surfaces. For example, the ring-shaped sealing and contact surfaces are arranged on material that is suitable for diffusion bonding under a suitable process temperature.

A bonding connection may use bonding material including glass that is arranged, melted and solidified between the adjoining ring-shaped sealing and contact surfaces. The applied glass bonding material for example, diffuses into the ring-shaped sealing and contact surfaces, thus establishing a unitary bridge or bond between the ring-shaped sealing and contact surfaces. The glass bonding material is for example, a sealing glass paste that may be dispensed or screen printed onto the ring-shaped sealing surfaces and/or the ring-shaped contact surfaces and that is then sealed to or fused with the adjoining sealing and contact surfaces by applying at least one thermal cycle with which the glass bonding material and/or the adjoining materials are heated to the sealing temperature.

A bonding connection may also include (e.g., consist of) a bonding material including metal that is arranged, melted and solidified between the adjoining ring-shaped sealing and contact surfaces.

For example, bonding is established by creating several layers, which optionally include an adhesion layer, for example including (e.g., consisting of) Ti, Cr or TiW, with a thickness in the exemplary range of 10 nm to 500 nm, that is used to establish adhesion with the corresponding ring-shaped sealing or contact surface. Optionally a stress relief layer is provided for example including (e.g., or consisting of) Cu, with a thickness in the exemplary range of 100 nm to 2000 nm, which serves to absorb compressive or tensile stress occurring within the layered structure. For example, a wetting/barrier layer for example including (e.g., or consisting of) nickel (Ni), nickel-vanadium (NiV), nickel-phoshor (NiP), with a thickness in the exemplary range of 100 nm to 5000 nm, and/or an oxidation protection layer for example including e.g., (e.g., consisting of) gold (Au), with a thickness in the exemplary range of 10 nm to 200 nm, are provided in addition. Optionally a solder layer is plated on top, for example including (e.g., consisting of) tin (Sn), tin-silver (SnAg), tin-gold (SnAu), indium (In) based alloy or any other suitable soldering alloy. Materials for the soldering layer are selected that have an acceptable processing temperature so that layers or material of the layered structure are not impaired or overheated during bonding processes.

In exemplary embodiments, bonding material is deposited in form of preforms, such as a first annular sealing preform placed between the first ring-shaped sealing surface and the first contact surface, as well as a second annular sealing preform placed between the second ring-shaped sealing surface and the second contact surface. The preforms made of glass or metal are then melted and solidified. The preforms include (e.g., consist of) a single material but may also include a plurality of materials or an alloy. Furthermore, a preform may include (e.g., consist of) a single layer or a plurality of layers, such as at least one of the following layers: an adhesion layer, a stress relief layer, a wetting/barrier layer, an oxidation protection layer, and/or a solder layer. These layers can be selected and combined according to the specific requirements.

As mentioned, the process temperatures $T_P$ applied to the layers of the layered structure are for example selected to be above the maximum operating temperature $T_{Omax}$ of the measurement unit. For example, the process temperature $T_P$ is by a factor k higher than the maximum operating temperature $T_{Omax}$ of the measurement unit; which factor $k=T_P/T_{Omax}$ is for example, in the exemplary range of 1.1 to 2.0 or more. The ratio would for example be in the exemplary range of 1.1 to 1.3 for tin solder. The ratio would can be in the exemplary range of 1.4 to 1.5 for a glass frit.

The measurement unit according to the exemplary disclosure is for example, includes an electrical module, such as a rigid or flexible PCB that may be used to collect, distribute and/or process information or signals. The electric module may include a processing unit and interfaces, with which electrical devices can be controlled or signals, e.g. received from a connected sensor can be processed. For example, the electrical module is connected to a thermal sensor. The electrical module is placed on the upper side of the substrate and is for example, connected by reflow soldering. For this purpose, the upper side of the substrate, e.g. a metal disc, is provided with a solderable layer, e.g. a Ni/Au layer.

The holding member has for example, a tubular or an annular form, which encloses a cavity or hollow space. As described above, at the lower side, the holding member exhibits a stepped profile arranged in a circle, to ensure that the layered structure is completely surrounded and hermetically sealed. The electrical module is for example, accessible. Furthermore, a lead-off wire connected to the electrical module or to the layered structure, for example, the electrically conducting layer, and optionally other wires can pass through. After assembly, the hollow space is filled and sealed with a moulding compound, such as an epoxy compound, which covers the upper side of the substrate and, if present the electrical module. The moulding compound for example, laterally adjoins the sealingly connected second ring-shaped sealing surface and the second contact surface, which are fused to one another, so that a dual stage sealing results. The holding member may be a long tube or a relatively small hollow cylindrical part, which can be mounted within a tube of an ion-sensitive electrode. In other words, in an exemplary embodiment the holding member may be a main part of the ion-sensitive electrode, which needs to be closed by a cap only. In an exemplary embodiment, the holding member is held at the front side of the main part of the ion-sensitive electrode (see FIG. 1 below).

In an exemplary embodiment, the ion-sensitive glass layer is kept under compressive stress over the whole range of the operating temperature of the measurement unit. While mechanical stress is avoided in order to avoid cracks and fissures, exemplary solutions disclosed herein intentionally pressurize the ion-sensitive layer. The ion-sensitive layer is for example always, and for example over the whole range of operating temperatures, kept under compressive stress with forces pointing to the centre of the ion-sensitive layer by applying pressure mechanically. By this measure, which is not limited to solid-state electrodes the occurrence of cracks and fissures are avoided.

Creating compressive stress within an ion-sensitive glass layer or glass membrane can be achieved in different ways. The ion-sensitive layer can be mounted under pressure. In exemplary embodiments as discussed below compressive stress in the ion-sensitive membrane is created by the connection to a mounting element, which after connection contracts to a desired extent, thereby exerting for example, radial forces onto the ion-sensitive glass layer, which is for example, a circular element, such as a disc. The desired stress state is a biaxial stress or more specifically an equibiaxial stress. In this state every element of the ion-sensitive membrane is under the same pressure from all sides (in a plane). In the layered structure, materials with suitable thermal expansion coefficients are for example, selected for the dominant layers, which under thermal treatment expand and after contraction pressurise the connected ion-sensitive glass layer. Alternatively or in addition, materials with suitable thermal expansion coefficients are selected for the holding member and the ion-sensitive glass membrane, which under thermal treatment expand and after contraction put pressure on the connected ion-sensitive glass layer.

The materials are for example, selected such that the thermal expansion coefficient of the ion-sensitive glass layer is smaller than the thermal expansion coefficient of the substrate. The ion-sensitive glass layer and the substrate are then connected or deposited upon one another, with the electrically conducting layer and optionally at least one intermediate layer in between, at a process temperature above the maximum operating temperature of the measurement unit, which is for example around 150° C. (e.g., plus or minus 10%). Of course, not only finished layer units can be connected in this way, but layers can also be produced or built partially or completely by any thin-film or thick film technology at the selected process temperature.

After connecting the ion-sensitive glass layer and the substrate for example via the electrically conducting layer and the intermediate layer, if present, the process temperature is lowered and the ion-sensitive glass layer and substrate will contract accordingly. Due to the higher thermal expansion coefficient the substrate will contract stronger than the ion-sensitive glass layer and will exert corresponding forces or pressure onto the ion-sensitive glass layer. These contraction forces applied by the substrate are for example radially aligned and for example point to the centre of the ion-sensitive glass layer. As the planar connection between the substrate and the ion-sensitive glass layer was established at the first process temperature, e.g. around about 300° C., the ion-sensitive membrane will always exhibit compressive stress regardless of the temperature currently present during measurement. The first process temperature is above the temperature of the measurement processes, which will for example not exceed about 150° C. The constantly pressurised glass layer is stabilised and will not exhibit cracks or fissures during thermal cycles or normal mechanical handling.

The connection of the holding member and the ion-sensitive glass membrane, which have different thermal expansion coefficients, is done analogously. Connection of the first ring-shaped sealing surface of the holding member and the first ring-shaped contact surface of the ion-sensitive glass layer is done at a process temperature above the maximum operating temperature of the measurement unit.

Process temperatures are, for example, always selected with regard to the materials used for the layered structure and the holding member. The differences of the thermal expansion coefficients and the related materials can be selected according to the given requirements and the conditions of use of the ion-sensitive electrode. In order to maintain compressive stress in the ion-sensitive glass layer over the whole range of the operating temperature, i.e. the ion-sensitive membrane, the material of the ion-sensitive glass layer and the material of the substrate and and/or the material thermal expansion coefficient of the ion-sensitive glass layer and the material of the holding member can be selected such that the related thermal expansion coefficients of the adjoining materials differ by a value for example, in the range from 1%-12.5%. For example, a value is selected in the range from 7.5%-11.5%. While it is desired to maintain the compressive stress in the ion-sensitive glass layer over the whole range of the operational temperature applied during the measurement processes, significant reduction of undesirable stress in the ion-sensitive glass layer is also accomplished when the range of the operation temperature is not fully covered. In the event that peak temperatures are seldom reached, such peak temperatures may be disregarded if other requirements need to be taken into account as well.

Exemplary technical solutions, as well as other beneficial advantages, of the present exemplary disclosure will be apparent from the following detailed description of exemplary embodiments of the present disclosure, with reference to the attached drawings.

FIG. 1 shows schematically a measurement system 100 with an exemplary ion-sensitive solid-state electrode 10, e.g. a pH-electrode, equipped with an exemplary solid-state measurement unit 1 and a reference electrode 8 immersed in a measurement solution 5. The ion-sensitive electrode 10 includes an electrode head 4, which for example, encloses at least part of a required measurement circuit that is connected to a first signal input port of a control unit 9, possibly a so-called transmitter, which includes a second signal input port, to which the reference electrode 8 is connected. Connection of the ion-sensitive electrode 10 and the reference electrode 8 to the control unit 9, which may include a display unit, is established by for example wire or wireless, e.g. inductively or by means of a wireless network. The electrode head 4 of the ion-sensitive electrode 10 is connected to the upper end of a tubular electrode body 3, which at the lower end is connected to the exemplary measurement unit 1. The measurement unit 1 includes a layered structure 6 with an ion-sensitive glass layer 11 exposed to the measurement solution 5. On the side facing the electrode head 4, the exemplary measurement unit 1 is provided with an electrical contact 20, possibly provided on an electrical module 16, such as a printed circuit board, (see FIG. 2). The electrical contact 20 is connected to a lead-off wire 2, which connects the measurement module 1 to the electrode head 4. Circuitry for processing the measured signal may be provided in the electrical module 16 and/or in the electrode head 4 and/or or in an external device.

Figure 2:
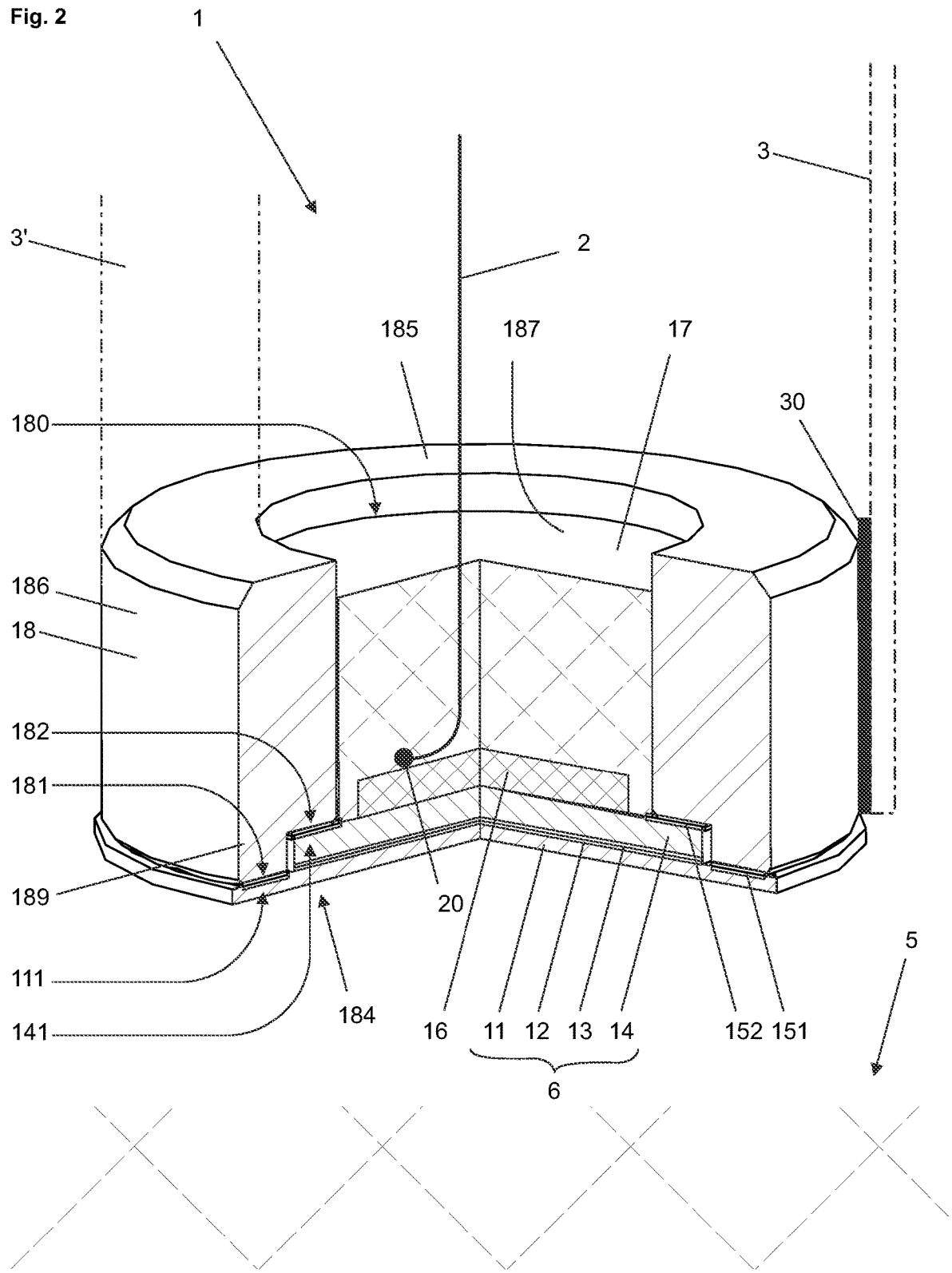
FIG. 2 shows in an exemplary sectional view the solid-state measurement unit 1 of FIG. 1 held above the measurement solution 5, with a layered structure 6 that is connected to a holding member 18 and that includes an ion-sensitive glass layer 11 connected via an intermediate layer 12 to an electrically conducting layer 13, which adheres to a substrate 14.

FIG. 2 schematically shows in a sectional view the exemplary solid-state measurement unit 1 of FIG. 1 held above the measurement solution 5, with a layered structure 6 that is connected to a holding member 18 and that includes an ion-sensitive glass layer 11 connected via an intermediate layer 12 to an electrically conducting layer 13, which adheres it to a substrate 14.

In the exemplary embodiment of a pH-electrode, the ion-sensitive glass layer 11 may be provided with a known pH-sensitive glass composition, such as is also suitable for glass membranes of known non-solid-state pH-electrodes. The ion-sensitive glass layer 11 is for example, provided in the exemplary embodiment of a glass wafer, which for example, exhibits a thickness in the exemplary range between 0.05 mm and 1 mm or higher. In an exemplary embodiment the ion-sensitive glass layer 11 is deposited by a known thin-film technology, e.g. by sputtering, onto the intermediate layer 12, the electrically conducting layer 13 or directly onto the metal substrate 14, in which the electrically conducting layer 13 may be integrated. However, as only a thin electrically conducting layer 13 is required, this electrically conducting layer 13 is for example, applied to the substrate 14 by thick-film or thin-film technology as well. The intermediate layer 12, if present, is for example, applied by thick-film or thin-film technology to the electrically conducting layer 13 or to the substrate 14, if the electrically conducting layer 13 is an integral part of the substrate 14. The sequence of building up the layers 11, 12, 13, 14 may also be reversed. It is also possible to connect any two layers 11, 12 or 12, 13 or 13, 14 in pairs that are further connected. For example, the layers 12 and 13 may be connected to each other, before being connected to layer 11 or 14. The intermediate layer 12 may be applied to the ion-sensitive glass membrane 11 or to the electrically conducting layer 13.

In an exemplary embodiment, the holding member 18, which for example, exhibits a maximum electrical resistance, is made of ceramic or glass. The substrate 14 for example, includes at least one or more of the following materials, metal, steel, ceramic, glass, glass ceramic, polymer compound, or fibre composite material. The electrically conducting layer 13 includes a metal or metal alloy with a reduction potential of at least about 1.0 V, for example, an alkali metal or a compound containing alkali metal, such as lithium or a lithium alloy. The intermediate layer 12, if present, is made of a solid-state electrolyte that for example, conducts ions of the electrically conducting layer 13, such as lithium ions. The ion-sensitive glass layer 11 is made of a glass that for example, conducts ions of the electrically conducting layer 13, such as lithium ions. Described below are materials and processes for manufacturing the layered structure 6.

In an exemplary embodiment, the electrically conducting layer 13 includes (e.g., consists of) lithium or a lithium alloy. The intermediate layer 12, which may be applied to this electrically conducting layer 13 or to the ion-sensitive glass layer 11, is a solid-state electrolyte layer that is conducting lithium ions. The electrolyte layer may include (e.g., consists of) of or may include for example: lithium borate, such as $B_2O_3$—$Li_2O$, lithium borat-sulphate (LiBSO), such as $B_2O_3$-$0.8Li_2O$-$0.8Li_2SO_4$, lithium borophosphate (LOP), such as ½x $Li_2O$—$BPO_4$, generally $Li_2O$—$B_2O_3$—$P_2O_5$, lithium-aluminate, such as $Li_5AlO_4$, lithium-borosilicate, such as $Li_2O$—$B_2O_3$—$SiO_2$, lithium-gallium oxide, such as $Li_5GaO_4$, lithium-germanate, such as $Li_{(4-3x)}Al_xGeO_4$, lithium-phosphate, such as $Li_{(1+x)}Ti_2Si_xP_{(3-x)}O_{12}$ or $Li_{(1+x)}M_xTi_{(2-x)}(PO_4)_3$ with M=Al, Ga, Fe, Sc, In, Lu, Y, La, lithium-phosphorus-pxynitride, such as $Li_3PO_{4-x}N_x$, lithium-silicate-aluminate, such as $LiAlSi_2O_6$, $LiAlSiO_4$, $Li_9SiAlO_8$, lithium-silicate, such as $Li_2SiO_4$, $Li_4SiO_4$, $Li_2SiO_3$, $Li_2Si_2O_5$, lithium-silicon phosphate, such as $Li_{3.6}Si_{0.6}P_{0.4}O_4$, lithium-silicon-phosphorus-oxynitride, such as $Li_4SiO_{4-x}$—$Li_3PO_{4-y}N_{x+y}$, lithium-thio-germanate, $Li_2GeS_3$, $Li_4GeS_4$, $Li_6GeS_5$, lithium-titanate, such as $Li_2Zr_{(1-x)}Ti_xO_3$, lithium-vanadate, lithium-compounds, such as $Li_2S$—$SiS_2$—$Li_3PO_4$ or $Li_7P_3S_{11}$, lithium-zinc oxides, such as $Li_6ZnO_4$, lithium-boron-oxynitride (Li—B—O—N), such as $Li_{3.09}BO_{2.53}N_{0.52}$, sulphides, such as $Li_2S$—$GeS_2$, and thio-lithium-germanium-compound, such as $Li_{10}GeP_2S_{12}$, $Li_{3.25}Ge_{0.25}P_{0.75}S_4$, or mixtures thereof.

In an exemplary embodiment, the solid-state electrolyte layer 12 includes an alkali metal-solid-state electrolyte compound, particularly a lithium-phosphorus-oxynitride-compound (LiPON), which is applied for example by sputtering. Further, thin-film processes suitable for applying the solid-state electrolyte layer 12 are for example: pulsed laser deposition, magnetron sputtering, reactive magnetron sputtering, CVD, vapour deposition, reactive vapour deposition, procedures, and plasma assisted chemical vapour deposition, such as plasma assisted CVD or vacuum plasma spray coating. The solid-state electrolyte layer 12 for example, exhibits a layer thickness in the range from 50 nm to 5000 nm or higher. Most suitable are layer thicknesses in the exemplary range from 100 nm to 1000 nm.

Subsequently the electrically conducting layer 13, which includes an alkali metal such as metallic lithium, i.e. pure lithium, an alloy including lithium-(0) or a lithium-solid-state compound, is applied to the solid-state electrolyte layer 12. The layer thickness of the electrically conducting layer 13 is for example, in the exemplary range between 10 nm to 10 μm or higher.

As described above, the measurement principle of the disclosed ion-sensitive electrode 10 and the solid-state measurement unit 1 is based on the ionic reaction between the measurement solution 5 and the ion-sensitive glass layer 11. The ion conducting solid-state electrolyte layer 12 supports a reversible redox reaction between ionic and metallic lithium at the interface between the solid-state electrolyte layer 12 and the electrically conducting layer 13, so that a measurement signal is provided at a suitable electrical contact, which is provided at the electrically conducting layer 13. Damage to the ion-sensitive glass layer 11, which is separated from the electrically conducting layer 13 by the intermediate layer, i.e. the solid-state electrolyte layer 12, is avoided.

As materials used for the layered structure 6, such as lithium for the electrically conducting later 13, are highly reactive to ambient chemical reactants such as $O_2$, $H_2O$, $N_2$, $CO_2$, etc., the measurement unit 1 is provided with a hermetic encapsulation, which prevents such chemical reactants from entering the measurement unit 1. At the same time it can be important, that direct electric contact as well as leakage currents are avoided. This is achieved with the encapsulation of the layered structure 6, which will be described with reference to FIG. 2 and to FIG. 3, which shows the measurement unit 1 in exploded view.

FIG. 2 shows that the ion-sensitive glass layer 11 of the layered structure 6 is provided with a first ring-shaped contact surface 111 and that the electrically conducting layer 13 is provided with a second ring-shaped contact surface 141. At its lower side 184 facing the layered structure 6, the holding member 18 is provided with a first ring-shaped sealing surface 181 that is sealingly connected to the first ring-shaped contact surface 111 of the ion-sensitive glass layer 11, and it is provided with a second ring-shaped sealing surface 182 connected to the second ring-shaped contact surface 141 of the substrate 14. The first ring-shaped sealing surface and the second ring-shaped sealing surface 182 of the holding member 18 are sealingly connected by an annular section 189 of the holding member 18.

The holding member 18 has an annular shape with a circular wall having an outer side 186 and an inner side 187, and it has a stepped profile at the lower side 184, which is facing the layered structure 6. The annular section 189 is therefore an integral part of the circular wall of holding member 18. Due to the stepped profile the first and second sealing surfaces 181, 182 are laterally joined to one another and are vertically displaced from one another. The measurement unit 1 can therefore be built in small dimensions.

Due to the hollow cylindrical shape of the holding member 18, the first and second ring-shaped sealing surfaces 181, 182 and the thereto corresponding first and second ring-shaped contact surfaces 111, 141 of the ion-sensitive glass layer 11 and the substrate 14 form circular closed loops that are arranged concentrically to one another.

Further, the disc shaped substrate 14 has an upper side facing the lower side 184 of the holding member 18 and a lower side facing the upper sides of the electrically conducting layer 13, the upper side if present, of the at least one intermediate layer 12, and the upper side of the ion-sensitive glass layer 11, which faces with its lower side the measurement solution 5. The first ring-shaped contact surface 111 is located on the upper side of the ion-sensitive glass layer 11 and the second ring-shaped contact surface 141 is located on the upper side of the substrate 14. Both ring-shaped contact surfaces 111, 141 are provided on the upper side of the layered structure 6 and can therefore easily be connected to the first and second sealing surfaces 181 and 182 of the holding member 18.

The stepped profile provided at the lower side 184 of the holding member 18 corresponds to a stepped profile of the layered structure 6 with the for example, circular ion-sensitive glass layer 11 having a diameter d11 that is larger than the diameter d14 of the for example, circular substrate 14 (see FIG. 5a). The stepped profile of the layered structure 6 and the stepped profile at the lower side of the holding member 18 therefore complement one another and provide mechanical stability to the individual layers 11, 12, 13.

The first ring-shaped sealing surface 181 of the holding member 18 is arranged in a first plane and the second ring-shaped sealing surface 182 of the holding member 18 is arranged in a second plane, which planes are aligned in parallel to the substrate 14 with a distance between one another that corresponds to the thickness th14 of the substrate 14 plus the thickness of the at least one intermediate layer 12 and the electrically conducting layer 13.

Figure 3:
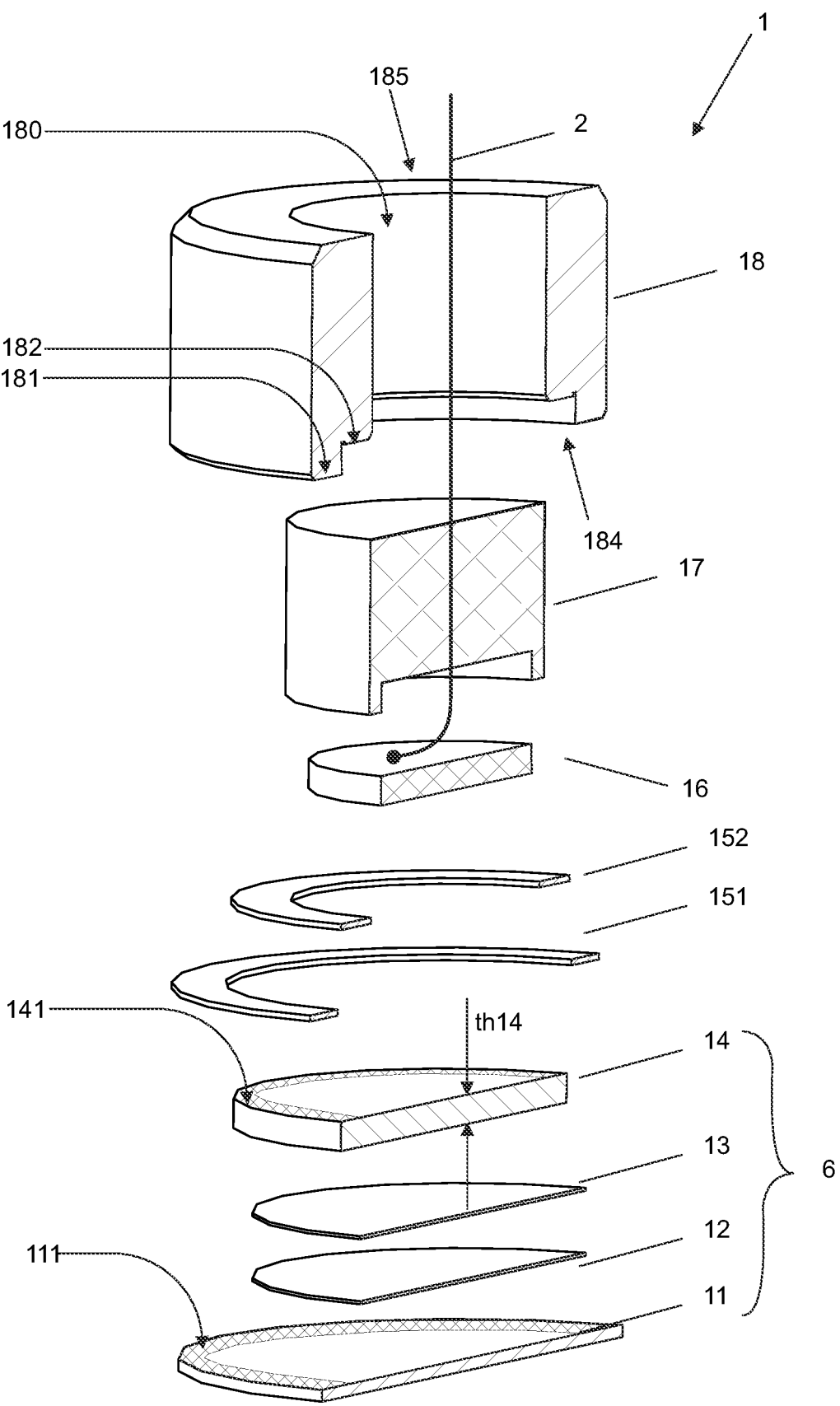
FIG. 3 shows the exemplary measurement unit 1 of FIG. 2 in exploded view.

In the exemplary embodiment of FIG. 2 and FIG. 3 the holding member 18 and the layered structure 6 are connected with one another by means of a first annular sealing preform 151 placed between the first ring-shaped sealing surface 181 of the holding member 18 and the first ring-shaped contact surface 111 of the ion-sensitive glass layer 11 as well as a second sealing preform 152 placed between the second ring-shaped sealing surface 182 of the holding member 18 and the second ring-shaped contact surface 141 of the substrate 14. By thermal treatment, the annular sealing preforms 151, 152 have been melted and solidified. During the melting process, the material of the sealing preforms 151, 152 is diffusing into the neighbouring surfaces 181, 111; 182, 141 and establishes contact bridges of for example, unified material so that the layered structure 6 is hermetically closed and encapsulated. The ion-sensitive glass layer 11, the holding member 18 and the substrate 14 form practically a unity that is hermetically enclosing the electrically conductive layer 13 and, if present, the intermediate layer 12. The annular connecting bridge between the ion-sensitive glass layer 11 and the substrate 14, which includes the melted sealing preforms 151, 152 and the holding member 18, has a very high electrical resistance and therefore suppresses any leakage current.

As described above, connections between the layered structure 6 and the holding member 18 can be established in other ways, e.g. by melting and diffusing material of the adjoining ring-shaped sealing and contact surfaces 181, 111; 182, 141. A bonding material including glass, e.g. a glass powder or glass paste, can also be arranged, melted and solidified between the adjoining ring-shaped sealing and ring-shaped contact surfaces 181, 111; 182, 141. Bonding material can also be deposited with any deposition process, e.g. by thick film technology and/or thin-film technology. A bonding material including glass, e.g. glass powder, can be used for bonding purposes. Such bonding material can be structured in several layers as described above.

FIG. 2 further shows that an electrical module 16 is placed on the upper side of the substrate 14. This electrical module 16 can contain measurement circuitry and can be connected to at least one sensor, e.g. a thermal sensor.

Still further, FIG. 2 shows that the holding member 18 has a tubular or annular form with a cavity 180 that is filled and sealed with a moulding compound 17, such as an epoxy compound, which covers the upper side of the substrate 14 and the electrical module 16 and laterally adjoins the sealingly connected second ring-shaped sealing surface 182 and second contact surface 141.

A lead-off wire 2 is connected to an electrical contact 20, which is connected to the electrically conducting layer 13 or to the electrical module 16.

FIG. 2 symbolically shows that the solid-state measuring unit 1, i.e. the holding member 18 is connected by means of an adhesive 30 to the lower end of the electrode body 3. As illustrated with dashed lines, in further exemplary embodiments, the holding member 18 could be an integral part of an electrode body 3' and could be a glass tube as used for known ion-sensitive electrodes, such as known pH-electrodes.

It has been described above that in further exemplary embodiments the ion-sensitive glass layer 11 is held under constant compressive stress, acting inward with distributed forces, for example, over the whole range of the specified operating temperature of the solid-state measurement unit 1 or the ion-sensitive electrode 10. Steps for reaching the desired state of the ion-sensitive glass layer 11 are described below.

FIG. 4a shows the ion-sensitive glass layer 11 and the holding member 18 of the measurement unit 1 of FIG. 2 before being connected to one another for example by means of an annular preform 151, shown here in dashed lines. The ion-sensitive glass layer 11 is shown without the other layers 12, 13, 14 of the layered structure 6, indicating that pressurising an ion-sensitive glass layer 11 can advantageously be done also without such a layered structure 6 and therefore also in non-solid-state ion-sensitive electrodes. Consequently, the holding member 18 can be an integral part of an electrode body 3' of an ion-sensitive non-solid-state electrode and the ion-sensitive glass layer 11 can be a known ion-sensitive glass membrane 11. I.e., the holding member 18 can be a glass tube connected to an ion-sensitive glass membrane 11 of a known ion-sensitive electrode, particularly a pH-electrode, as described above with reference to "A guide to pH-measurement", March 2016, Mettler-Toledo GmbH. For the sake of simplicity, the term ion-sensitive glass layer is used below, although such ion-sensitive glass layer can be a known ion-sensitive glass membrane.

In an exemplary embodiment, in order to obtain an ion-sensitive electrode with a constantly pressurised ion-sensitive glass layer the thermal expansion coefficients of the connected materials are selected as follows. The thermal expansion coefficient $\alpha_{11}$ of the ion-sensitive glass layer 11 is smaller than the thermal expansion coefficient $\alpha_{18}$ of the holding member 18.

As symbolically shown in FIG. 4b with arrows of different size, when heating the materials to a first process temperature the expansion of the holding member 18 will be greater than the expansion of the ion-sensitive glass layer 11. The holding member 18 and the ion-sensitive glass layer 11 are connected in this state, e.g. by melting the adjoining materials or by melting the first annular sealing preform 151 or other connecting material that has been provided between the first sealing surface 181 of the holding member 18 and the first contact surface 111 of the ion-sensitive glass layer 11. In FIG. 4b it is shown that the first annular sealing preform 151 or a functionally equivalent adhesive has been applied to the first sealing surface 181 of the holding member 18 and the ion-sensitive glass layer 11 is now connected thereto at the first process temperature. After connecting the ion-sensitive glass layer 11 to the holding member 18, the resulting structure is cooled down to room temperature. During this process, the ion-sensitive glass layer 11 and the holding member 18 contract according to their thermal expansion coefficients $\alpha_{11}$, $\alpha_{18}$ with the result that the contracted holding member 18 exerts a pressure with forces acting radially on the ion-sensitive glass layer 11.

FIG. 4c shows the contracted ion-sensitive glass layer 11 and the contracted holding member 18 of FIG. 4b connected to one another at room temperature with the constant pressure applied by the holding member 18 onto the ion-sensitive glass layer 11. During the use of the known or solid-state ion-sensitive glass electrode 10 cracks and fissures are avoided, which in known electrodes often appear.

In solid-state exemplary embodiments of the ion-sensitive glass electrodes 10, i.e. in the inventive measurement unit 1, a pressurised ion-sensitive glass layer 11 is for example, reached by suitably selecting the thermal expansion coefficients of the layers 11, 12, 13, 14 of the layered structure 6.

FIG. 5a shows in sectional view the exemplary ion-sensitive glass layer 11 and the substrate 18 of the measurement unit 1 of FIG. 2 with an optionally separated electrically conducting layer 13 and an optional intermediate layer 12 before being connected to one another. The thermal expansion coefficient $\alpha_{11}$ of the ion-sensitive glass layer 11 is smaller than the thermal expansion coefficient $\alpha_{14}$ of the substrate 14. The thermal expansion coefficients $\alpha_{12}$ of am of the intermediate layer 12 and the electrically conducting layer 13 for example, corresponds to the thermal expansion coefficient $\alpha_{14}$ of the substrate 14. However, they could also be selected according to the thermal expansion coefficient $\alpha_{11}$ of the ion-sensitive glass layer 11 or in the exemplary range between the thermal expansion coefficient $\alpha_{11}$ of the ion-sensitive glass layer 11 and the thermal expansion coefficient $\alpha_{14}$ of the substrate 14. The ion-sensitive glass layer 11 and the substrate 14 are connected or deposited upon one another under a second process temperature above the maximum operating temperature of the measurement unit 1. The second process temperature may be stepped and cycled as desired or required. Thermal energy is applied in accordance with the assembly process and under consideration of the materials used. First, the layered structure 6 is assembled and then the holding member 18 is added in another process cycle.

FIG. 5b shows the expanded ion-sensitive glass layer 11 and the expanded substrate 14 of FIG. 5a with the electrically conducting layer 13 and the at least one optional intermediate layer 12 attached to the ion-sensitive glass layer 11, while being connected at the second process temperature. In an exemplary embodiment, a first part of the electrically conducting layer 13 is applied to the substrate 14 and a second part of the electrically conducting layer 13 is applied to the intermediate layer, e.g. electrolyte layer 12. Then the layered structure 6 is assembled and hot pressed, e.g. at about 250° C., so that a diffusion bond is established between the first and second part of the electrically conducting layer 13.

FIG. 5c shows the contracted ion-sensitive glass layer 11 and the contracted substrate 14 with the electrically conducting layer 13 and the at least one optional intermediate layer 12 of FIG. 5b connected to one another at room. As symbolically shown with arrows pointing to the centre of the ion-sensitive glass layer 11, the ion-sensitive glass layer 11 remains under constant compressive stress when used within the specified range of the operating temperature, thus avoiding cracks and fissures.

Figure 6:
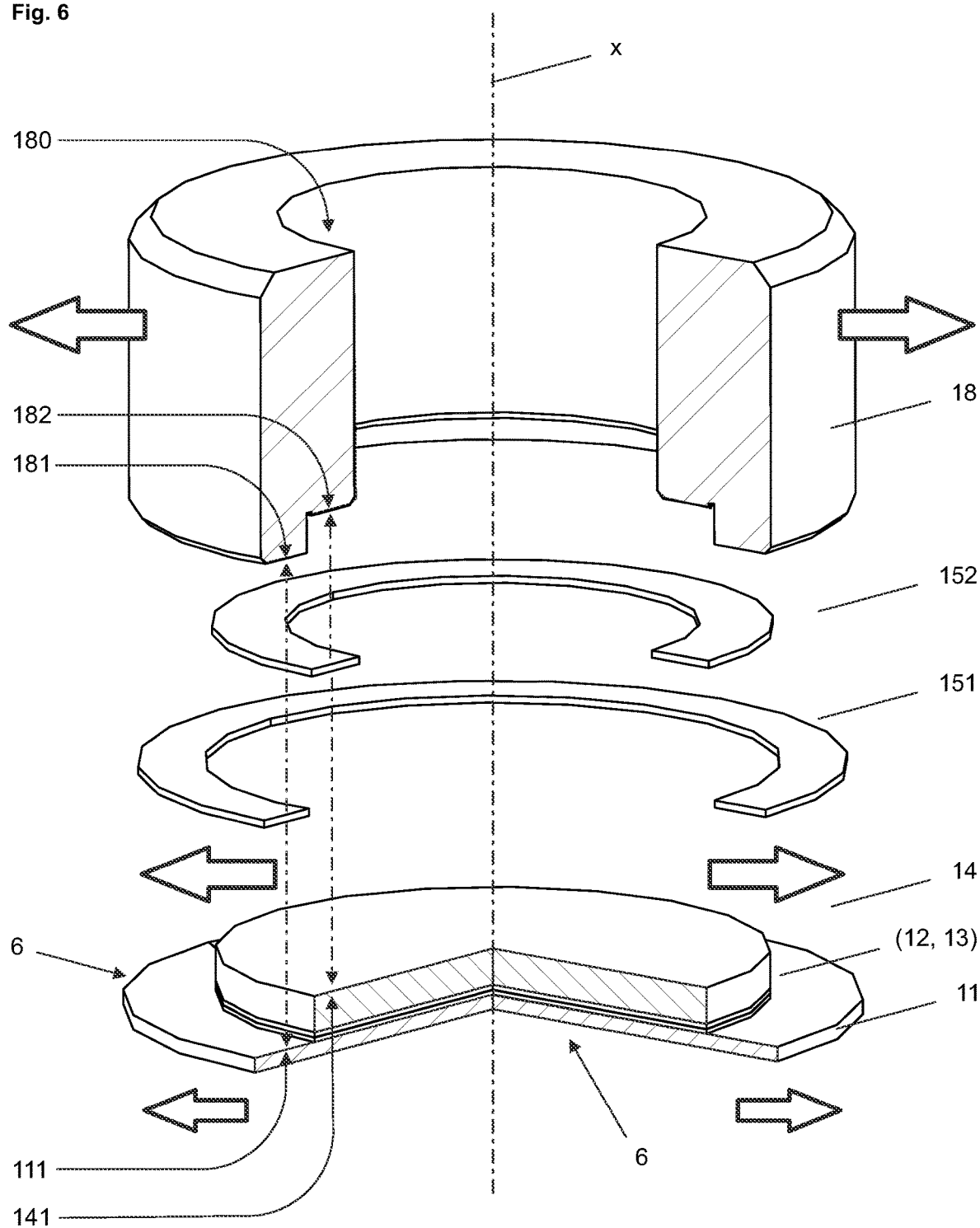
FIG. 6 shows in an exemplary expanded view the layered structure 6 of FIG. 5c and the expanded holding member 18 together with two sealing preforms 151, 152, while being connected to one another at a process temperature well above the maximum operating temperature of the measurement unit 1.

FIG. 6 shows the exemplary expanded layered structure 6 of FIG. 5c and the expanded holding member 18 together with two sealing preforms 151, 152, while being connected to one another at a process temperature, e.g. the mentioned first process temperature, which lies well above the maximum operating temperature of the measurement unit 1. After connecting the holding member 18 to the layered structure 6, both the substrate 14 and the holding member 18 hold the ion-sensitive layer 11 under constant compressive stress over the whole range of the operating temperature of the measurement unit 1.

It will be appreciated by those skilled in the art that the present exemplary disclosure can be embodied in other specific forms without departing from the spirit or essential characteristics thereof. The presently disclosed exemplary embodiments are therefore considered in all respects to be illustrative and not restricted. The scope of the exemplary disclosure is indicated by the appended claims rather than the foregoing description and all changes that come within the meaning and range and equivalence thereof are intended to be embraced therein.

REFERENCE SIGNS LIST 1 measurement unit
2 lead-off wire
3 electrode body, e.g. glass tube
4 electrode head
5 measurement solution
6 layered structure
8 reference electrode
9 control unit
10 electrochemical sensor/pH-electrode
11 ion-sensitive membrane
12 intermediate layer
13 electrically conducting layer
14 substrate
16 electric module
17 moulding compound
18 holding member
30 adhesive
100 measurement system
111 first contact surface
141 second contact surface
151 first annular sealing preform
152 second annular sealing preform
180 cavity
181 first sealing surface
182 second sealing surface
184 lower side of the holding member 18
185 upper side of the holding member 18
186 outer side of the holding member 18
187 inner side of the holding member 18
189 annular section of the holding member 18

The invention claimed is:

1. A measurement unit for an ion-sensitive solid-state electrode for measuring pH in a measurement solution, with a layered structure, the measurement unit comprising:
an ion-sensitive glass layer with a first ring-shaped contact surface;
an electrically conducting layer formed of a metal or a metal alloy that directly or via at least one intermediate layer adheres to the ion-sensitive glass layer, and
a substrate that adheres to the electrically conducting layer and is provided with a second ring-shaped contact surface, and with a holding member made of glass or ceramic that is provided with a first ring-shaped sealing surface, a second ring-shaped sealing surface, and an annular section, the substrate formed of a material comprised of at least one of metal, steel, ceramic, glass, polymer, or a fiber composite material;
wherein the first ring-shaped sealing surface is sealingly connected to the first ring-shaped contact surface,
wherein the second ring-shaped sealing surface is connected to the second ring-shaped contact surface of the substrate,
wherein the first and second ring-shaped sealing surfaces of the holding member are sealingly connected by the annular section,
wherein the substrate is disc shaped, having an upper side facing a lower side of the holding member and a lower side facing an upper side of the ion-sensitive glass layer, the ion-sensitive glass layer having a lower side that faces the measurement solution,
wherein the first ring-shaped contact surface is located on the upper side of the ion-sensitive glass layer and the second ring-shaped contact surface is located on the upper side of the substrate,
wherein to prevent a formation of cracks in the measurement unit, at least one of:
a thermal expansion coefficient ($\alpha_{11}$) of the ion-sensitive glass layer is smaller than a thermal expansion coefficient ($\alpha_{14}$) of the substrate, and
the thermal expansion coefficient ($\alpha_{11}$) of the ion-sensitive glass layer is smaller than a thermal expansion coefficient ($\alpha_{18}$) of the holding member.

2. A measurement unit according to claim 1, wherein:
the holding member includes ceramic or glass;
the substrate includes at least one or more of the following materials: metal, steel, ceramic, glass, glass ceramic, polymer compound, or fibre composite material;
the electrically conducting layer includes a metal or metal alloy with a reduction potential of at least 1.0 V; and
the ion-sensitive glass layer includes a glass that conducts ions of the electrically conducting layer.

3. A measurement unit according to claim 2, comprising:
the at least one intermediate layer, which includes a solid-state electrolyte.

4. A measurement unit according to claim 1, comprising:
the at least one intermediate layer, which includes a solid-state electrolyte.

5. A measurement unit according to claim 4, wherein the solid-state electrolyte of the at least one intermediate layer is configured to conduct ions of the electrically conducting layer.

6. A measurement unit according to claim 1, wherein the electrically conducting layer includes lithium or a lithium alloy as metal or metal alloy with a reduction potential of at least 1.0 V; and wherein ions of the electrically conducting layer are lithium ions.

7. A measurement unit according to claim 1, wherein at least one of the first and second ring-shaped sealing surfaces or the first and second ring-shaped contact surfaces form circular closed loops that are arranged concentrically or offset from one another.

8. A measurement unit according to claim 1, wherein the layered structure has a first stepped profile with the ion-sensitive glass layer having a diameter that is larger than a diameter of the substrate, which stepped profile of the layered structure complements a second stepped profile provided at the lower side of the holding member.

9. A measurement unit according to claim 1, wherein the first ring-shaped sealing surface of the holding member is arranged in a first plane and the second ring-shaped sealing surface of the holding member is arranged in a second plane; and wherein the first and second planes are aligned in parallel to the substrate, with a distance between one another that corresponds approximately to a combined thicknesses of the substrate, the electrically conducting layer and, if present, the at least one intermediate layer.

10. A measurement unit according to claim 1, wherein the first ring-shaped sealing surface and the first ring-shaped contact surface, and the second ring-shaped sealing surface and the second ring-shaped contact surface, are bonded with one another respectively by either of the following materials:
   a) diffused material of the bonded first ring-shaped sealing and contact surfaces and the bonded second ring-shaped sealing and contact surfaces; or
   b) a bonding material including glass or metal that has been arranged, melted and solidified between the bonded first ring-shaped sealing and contact surfaces and the bonded second ring-shaped sealing and contact surfaces.

11. A measurement unit according to claim 10, wherein
   a) the bonding material is positioned on at least one of the bonded first ring-shaped sealing and contact surfaces and at least one of the bonded second ring-shaped sealing and contact surfaces as a deposition; or
   b) the bonding material is in a form of a melted and solidified preform.

12. A measurement unit according to claim 11, wherein the preform comprises:
   a first annular sealing preform placed between the first ring-shaped sealing surface and the first ring-shaped contact surface as well as a second annular sealing preform placed between the second ring-shaped sealing surface and the second ring-shaped contact surface.

13. A measurement unit according to claim 1, comprising, in combination:
   an electrical module connected to a thermal sensor, placed on the upper side of the substrate.

14. A measurement unit according to claim 1, wherein the holding member has a tubular or annular form with a cavity that is filled and sealed with a moulding compound, which moulding compound covers the upper side of the substrate and laterally adjoins the connected second ring-shaped sealing surface and the second ring-shaped contact surface.

15. A measurement unit according to claim 1, wherein the ion-sensitive glass layer is held under compressive stress over a whole range of a specified operating temperature of the measurement unit:
   a. by mounting the ion-sensitive glass layer under pressure; and/or
   b. selecting materials with thermal expansion coefficients for the holding member and the ion-sensitive glass layer, which under thermal treatment expand and after contraction put pressure on the ion-sensitive glass layer; and/or
   c. by selecting the thermal expansion coefficients of the ion-sensitive glass layer, the at least one optional intermediate layer, the electrically conducting layer and the substrate.

16. A measurement unit according to claim 15, wherein the thermal expansion coefficient ($\alpha_{11}$) of the ion-sensitive glass layer is smaller than the thermal expansion coefficient ($\alpha_{14}$) of the substrate, and wherein formation of the ion-sensitive glass layer and the substrate are connected or deposited upon one another at a first temperature above a maximum operating temperature of the measurement unit.

17. A measurement unit according to claim 16, wherein the thermal expansion coefficient ($\alpha_{11}$) of the ion-sensitive glass layer is smaller than the thermal expansion coefficient ($\alpha_{18}$) of the holding member; and wherein the ion-sensitive glass layer and the holding member are connected to one another at a second temperature above the maximum operating temperature of the measurement unit.

18. A measurement unit according to claim 17, wherein the thermal expansion coefficient ($\alpha_{11}$) of the ion-sensitive glass layer and the thermal expansion coefficient ($\alpha_{14}$) of the substrate, and the thermal expansion coefficient ($\alpha_{11}$) of the ion-sensitive glass layer and the thermal expansion coefficient ($\alpha_{18}$) of the holding member differ by a value in the range from 1%-12.5%.

19. A pH-sensitive solid-state electrode comprising, in combination:
   an electrode; and
   a measurement unit according to claim 1.

* * * * *